April 30, 1929.  J. E. LOSHBOUGH  1,710,705
NONREPEAT MECHANISM FOR POWER PRESSES
Filed Dec. 19, 1927  2 Sheets-Sheet 2
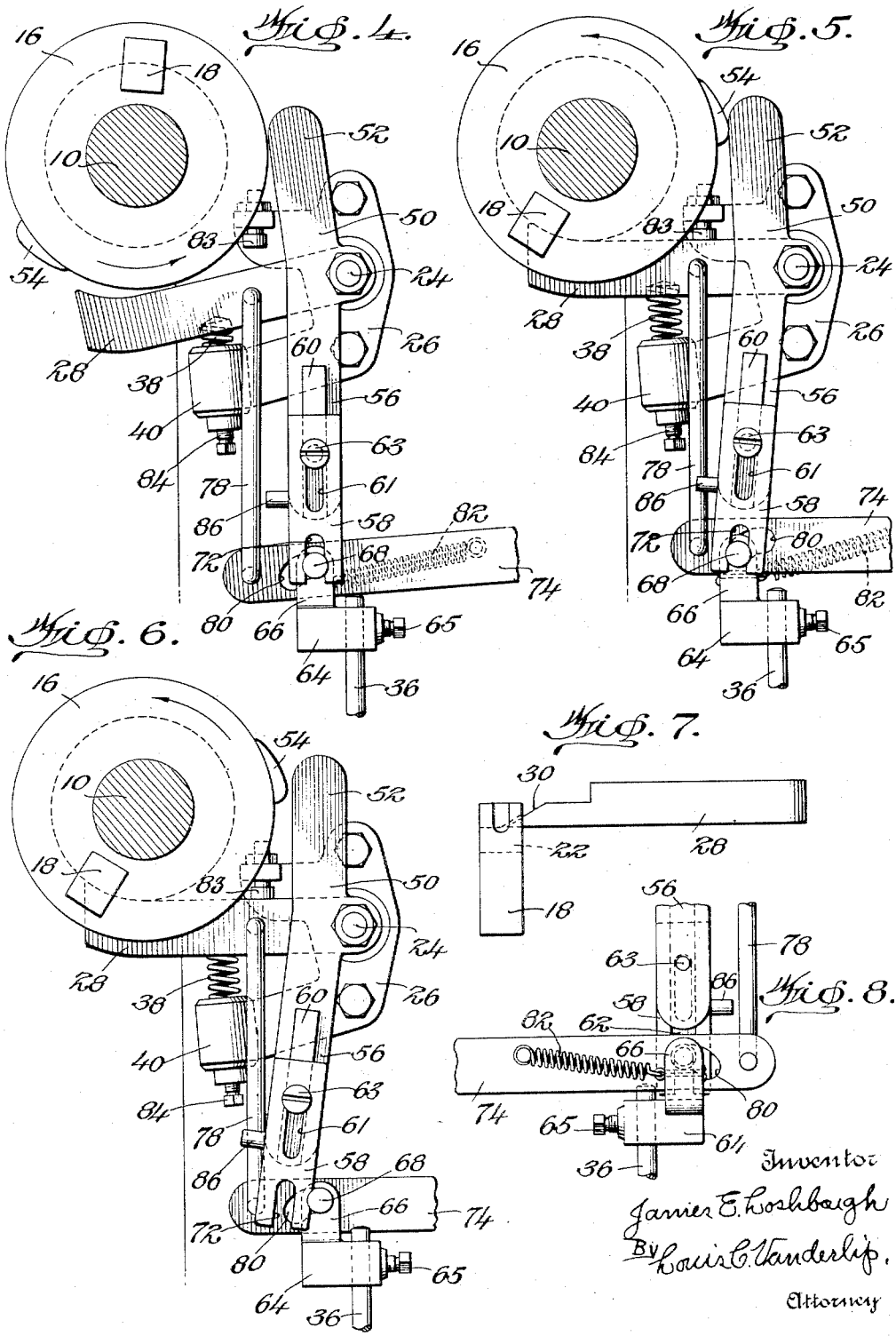

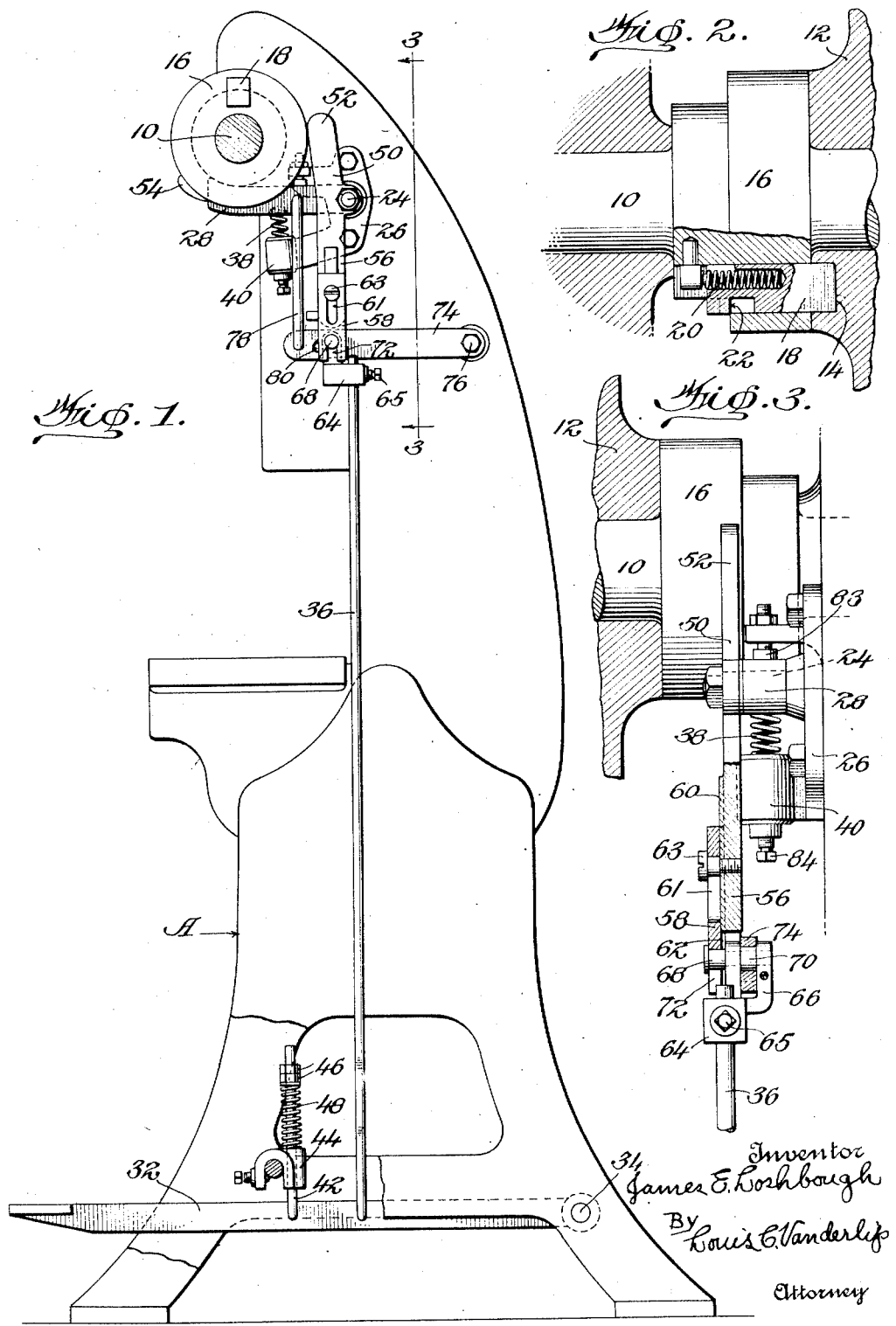

Patented Apr. 30, 1929.

1,710,705

UNITED STATES PATENT OFFICE.

JAMES E. LOSHBOUGH, OF ELKHART, INDIANA.

NONREPEAT MECHANISM FOR POWER PRESSES.

Application filed December 19, 1927. Serial No. 240,976.

My invention relates to improvements in clutch control mechanisms and has particular reference to a clutch actuating mechanism especially adapted for use in connection with punch presses and other machines embodying essentially a continuously rotating power member, a rotatable drive shaft, cooperating clutch elements between said power member and said drive shaft adapted to be moved into and out of clutching engagement with one another to cause intermittent rotation of the drive shaft to be produced during continuous rotation of the power member, and a hand or foot lever having an operative connection with one of said clutch elements for manually controlling its movement into and out of engagement with the other clutch element, my improved clutch control mechanism being adapted to constitute part of the connection between the foot pedal and the clutch.

Assuming the clutch elements to be disengaged, it is necessary according to my invention to depress the hand or foot lever to permit engagement of the clutch elements, and unless the clutch elements are disengaged the machine will, of course, operate continuously. It is my purpose therefore to provide a clutch control mechanism which will operate automatically as a safety device, both in respect to work being performed and in respect to the attendant at the machine, to disengage the clutch elements at the end of each cycle of operation of the machine, regardless of whether the attendant releases or fails to release the hand or foot lever following its actuation to engage the clutch elements.

It also is my purpose to provide a clutch control mechanism operating as stated and which may readily be adjusted to permit continuous operation of the machine without disturbing the operative connection between the hand or foot lever and the clutch, whereby the said lever always is available for starting and stopping the machine.

Moreover, it is my purpose to provide a clutch control mechanism according to the foregoing which is of simple, inexpensive construction, strong, durable, compact and thoroughly reliable and efficient in use.

With the foregoing and other purposes in view, my invention consists in the novel features of construction, combination and arrangement of parts as will be hereinafter more fully described, illustrated in the accompanying drawings and defined in the appended claims.

In the drawings, wherein like characters of reference denote corresponding parts in the different views:—

Fig. 1 is a side elevation of a conventional form of power punch press showing my improved clutch control mechanism operatively associated therewith;

Fig. 2, a detail sectional view of the clutch between the drive shaft and the continuously rotating power member of the machine;

Fig. 3, an enlarged rear elevation of my clutch control mechanism, partly in section, as viewed on the line 3—3 of Fig. 1;

Fig. 4, an enlarged side elevation of my clutch control mechanism showing the parts thereof in the position they occupy following depression of the hand or foot lever to permit engagement of the clutch elements;

Fig. 5, a view similar to Fig. 4 showing the position automatically assumed by the parts of my clutch control mechanism to disengage the clutch elements and cause stoppage of the machine in the event the attendant fails to release the hand or foot lever following its depression to permit engagement of the clutch elements;

Fig. 6, a view similar to Figures 4 and 5 showing my clutch control mechanism adjusted to permit continuous operation of the machine as long as the hand or foot lever is maintained depressed;

Fig. 7, a diagrammatic plan view showing the construction whereby one of the clutch elements is adapted to be moved out of engagement with its related clutch element; and Fig. 8, a detail view showing the means for restoring the mechanism to its normal position upon release of the foot pedal.

While my invention is capable of use in connection with power operated machines of various different types designed to perform various different functions, I have chosen for convenience to illustrate it as embodied in a power punch press for the reason that it is in connection with this class of machines that it finds particular utility.

The punch press illustrated, designated generally at A, is of conventional design and includes, as usual, a horizontally disposed, rotatable drive shaft 10 at or near its upper end and a continuously rotating power member in the form of a fly wheel 12, illustrated fragmentarily in Figures 2 and 3 loosely mounted on the shaft 10. In the hub of the fly wheel 12 is formed a recess 14 constituting one element of a clutch, while mounted in an enlargement 16 on the shaft 10 for sliding movement in the direction of the axis of said shaft into and out of the recess 14 is a bolt 18 constituting the second element of the clutch. A coil spring 20 constantly urges the bolt in the direction of the fly wheel 12, so that unless said bolt is held retracted against the force of said spring its outer end will enter the recess 14 and thus lock the fly wheel and shaft together for rotation in unison. As is obvious, however, if the bolt is held retracted, the shaft 10 will remain stationary and the fly wheel will continue to rotate. Ordinarily the shaft 10 is formed with a crank to which is connected a pitman for operating a reciprocal die or punch mechanism, and ordinarily too a brake is provided to stop the shaft 10 from rotating when the bolt 18 is withdrawn from the recess 14, but as these parts are old and well known and form no part of my present invention, they have not been illustrated.

Formed in the outer edge of the bolt 18 is a recess 22, while pivoted at one end as at 24 to a suitable fixed support, as, for example, the frame of the machine, or a bracket 26 secured to the frame, is a dog 28, the free end portion of which is swingable towards and away from the axis of shaft 10 into and out of the path of rotation of the bolt as the latter turns with the shaft, a cam face 30 being formed on the free end portion of said dog whereby, when the same is swung into the path of rotation of the bolt and as the latter rotates with the shaft, the recess 22 will be entered by the free end portion of the dog and the cam face 30 thereon cooperating with the rear end wall of said recess 22 will act to withdraw the bolt from the recess 14 in the fly wheel.

A hand or foot lever 32 is pivoted at one end as at 34 to the frame of the machine at or near the base thereof and is connected at an intermediate point by a rod 36 to my control mechanism which, in turn, is connected with an intermediate portion of the dog 28, so that depression of said lever swings said dog away from the shaft 10 and out of the path of rotation of the bolt 18, whereby the spring 20 is permitted to act to slide said bolt into the recess 14 in the fly wheel when, during rotation of the latter, said recess comes into alinement with the bolt. A coil spring 38 located between the dog 28 and a suitable fixed support 40, such as an extension of the bracket 26 constantly tends to swing the free end portion of said dog towards the shaft 10 into the path of rotation of the bolt 18, so that upon release of whatever means is employed to hold said dog out of the path of rotation of the bolt 18, said dog 28 will be swung to a position to cause withdrawal of said bolt from the recess 14.

A rod 42 is secured at one end to the hand or foot lever 32 and extends upward loosely through a bracket 44, being equipped at its free end with adjusting and lock nuts 46 and being surrounded between said nuts and said bracket 44 by an expansion coil spring 48 which acts to elevate said lever when it is released following its depression.

A rocker arm 50 is mounted at an intermediate point for rocking or tilting movements, preferably, but not necessarily, on the same pivot 24 as the dog 28, one end portion 52 of said rocker arm extending into proximity to the enlargement 16 for cooperation with a projection 54 carried by said enlargement and the other end portion 56 thereof having connected therewith an extension member 58 which is longitudinally slidable, but otherwise immovable with respect thereto, such a connection between the portion 56 of said rocker arm and said extension member being provided in any desired manner, for example, as shown, by forming a rib 60 on the portion 56, forming a groove 62 in the inner face of the extension member to receive said rib, forming a slot 61 in the extension member and passing a screw or bolt 63 through said slot into the portion 56 to secure the extension member thereto.

A block 64 having an opening to receive the upper end of the rod 36 is adapted to be secured in a desired adjusted position along said rod by a set screw 65, said block having formed thereon a pair of spaced ears 66 through which is passed a pin 68 which projects at one end outwardly from the outer ear and between said ears is equipped with a small roller 70. The free or outer end of the extension member 58 is bifurcated or slotted as indicated at 72 and normally the outward extension of the pin 68 is disposed in said bifurcation or slot.

An arm 74 is pivoted at one end as at 76 to a suitable fixed support such as a portion of the frame of the machine and at its other or free end is connected by a link 78 with the dog 28. Near its free end said arm 74 has formed therein a slot 80 so shaped that the end thereof nearest the outer end of the arm is lower than the end thereof nearest the pivot of the arm. Arm 74 is received between the ears 66 of the block 64 and the roller 70 is disposed in the slot 80 of said arm. A contractile coil spring 82 is connected at one end with the arm 74 and at its other end with a suitable part of the block 64, as best illustrated in Fig. 8, and thereby tends constantly to draw the roller 70 into the higher end of the slot 80.

If desired an adjustable stop 83 may be provided to limit swinging movement of the dog 28 towards the shaft 10, screw means 84 may be provided to adjust the power of the spring 38 and a finger grip pin 86 may be formed on or secured to the extension member 58 to facilitate manual manipulation of the same relative to the rocker arm 50.

The operation of my mechanism is apparent and as follows: Normally the parts occupy the relative positions shown in Fig. 1, the hand or foot lever 32 being elevated, the dog 28 being disposed in the path of rotation of the bolt 18 and the roller 70 being disposed in the high end of the slot 80. With the parts in this position if it is assumed that the bolt 18 is engaged in the recess 14 of the continuously rotating fly wheel 12, locking the fly wheel to the shaft 10, it is manifest that as the bolt rotates with the shaft past the free end of the dog 28 the said free end of the dog will enter the recess 22 and because of the cam face 30 thereon the bolt will be withdrawn from the recess 14, the shaft 10 as a result, since it then lacks power to drive it, being brought to a stop while the fly wheel continues to rotate. The dog 28 as is manifest will hold the bolt retracted against the force of the spring 20 until said dog is swung out of the path of rotation of the bolt, or, in other words, to the position of Fig. 4, and, as is further manifest, such swinging movement of the dog is adapted to be effected by the hand or foot lever 32. Upon depression of the hand or foot lever 32 the block 64 is pulled downward by the rod 36 and because of the roller 70 carried by said block being disposed in the slot 80, the arm 74 will be swung downward and through its link connection 78 with the dog 28 will as a consequence pull the latter downward out of the path of rotation of the bolt 18, the roller 70 remaining in the high end of the slot 80 under the influence of spring 82. The parts now being in the position of Fig. 4 it follows that as the recess 14 in the fly wheel comes into alinement with the bolt 18 the latter will be projected by the spring 20 into said recess, thus locking the fly wheel 12 and shaft 10 together, so that power from the former is transmitted to the latter. If now the attendant releases the hand or foot lever 32, the springs 38—48 will immediately restore the parts to the position of Fig. 1, so that the operation just recounted and automatic stoppage of the machine will be repeated when the bolt 18 again rotates to a position in engagement with the dog 28. If, on the other hand, through carelessness or other cause the attendant fails to release the hand or foot lever, or if for any other reason it should fail to respond to the elevating influence of the spring 48, the projection 54 which is located on the enlargement 16 in advance of the bolt 18 will strike the free end portion 52 of lever 50 just before the bolt 18 reaches the free end of the dog 28 and will rock said arm 50 on its pivot 24 and as a consequence swing the other end portion 56 thereof towards the outer or free end of the arm 74 as shown in Fig. 5. This, obviously, will result in the extension 58 swinging the block 64 in the same direction, as permitted by flexure or pivotal movement of the rod 36, and as a consequence the arm 74 will be permitted to swing upward due to the roller 70 then being moved into the lower portion of the slot 80, the spring 38 acting simultaneously with rocking of the arm 52 by the projection 54 to move the dog 28 into the path of rotation of the bolt 18, as such movement of the dog 28 is permitted as aforesaid by the roller 70 being moved into the lower portion of the slot 80, upward movement of dog 28 resulting in upward movement of the arm 74 because of the link connection 78 between these parts. In other words, because of the slot 80, tripping of the rocker arm 50 by the projection 54 will result in an increase in the effective length of the connection between the dog 28 and the lever 32 which will permit the dog to assume a clutch disengaging position under the influence of spring 38. Thus the dog 28 will act as before to stop the machine if the hand or foot lever is not released following its depression. When the dog 28 under such conditions has operated to withdraw the bolt 18 from the recess 14, the projection 54 will have passed the portion 52 of rocker arm 50 and said rocker arm will then be free so far as said projection is concerned to return to its normal position. Since, however, the spring 38 is stronger than the spring 82, the parts will remain in the position of Fig. 5 and it will be impossible to again start the machine until the lever 32 is elevated, so that when subsequently depressed, it will move the dog 28 out of the path of rotation of the bolt 18, or unless some part of my mechanism such as the extension member 58 is tampered with. On the other hand, if the lever 32 is released and permitted to rise the spring 82 will draw the roller 70 again into the high part of the slot 80 and at the same time swing the rocker arm 50 on its pivot to its original or normal position, as shown in Fig. 1, so that when the lever 32 then is depressed, it will swing the arm 74 and dog 28 downward, releasing the bolt 18 and permitting a driving connection again to be established by the bolt 18 between the fly wheel 12 and the shaft 10.

If it is desired for any reason to exclude my mechanism from its automatic control of the bolt 18, to enable the machine to be operated continuously, all that is necessary to be done is to slide the extension member 58 upward on the portion 56 of rocker arm 50, swing said rocker arm to the position of Fig. 6 to position the end portion 52 thereof out of the path of rotation of the projection 54, and then slide the extension member outward, so that its rear edge will lie against the pin 68 thus to maintain an inoperative position of the rocker arm, which, however, does not affect the connection between the arm 74 and dog 28, so that as long as the lever 32 is maintained depressed, the machine will operate continuously. To restore the automatic control the slot 72 in the extension member simply is reengaged with the pin 68.

I claim:—

1. A clutch control mechanism comprising a dog constantly urged towards a clutch releasing position, a manually operable lever, an arm having a slot therein one end of which is nearer than the other end to said dog, a member movable in said slot, a connection between said member and said lever, a connection between said arm and said dog, means constantly urging said member into the end of said slot nearest said dog, and means for automatically moving said member towards the other end of said slot following movement of said lever from a normal position to move said dog from a clutch releasing position and failure of said lever to be returned to its normal position.

2. A clutch control mechanism comprising a dog constantly urged towards a clutch releasing position, a manually operable lever, an arm having a slot therein one end of which is nearer than the other end to said dog, a member movable in said slot, a connection between said member and said lever, a connection between said arm and said dog, means constantly urging said member into the end of said slot nearest said dog, a rocker arm operatively connected at one end with said member, and means for cooperation with the other end of said arm for rocking same at predetermined times to move said member towards the end of said slot farthest from said dog.

3. A clutch control mechanism comprising a dog constantly urged towards a clutch releasing position, a manually operable lever, an arm having a slot therein one end of which is nearer than the other end to said dog, a member movable in said slot, a connection between said member and said lever, a connection between said arm and said dog, means constantly urging said member into the end of said slot nearest said dog, an intermediately pivoted rocker arm, an extension member carried by one end portion of said rocker arm movable with respect to said rocker arm into and out of operative connection with the member in said slot, and means for cooperation with the other end portion of said rocker arm for rocking same at predetermined times when said extension member is operatively connected with the member in said slot to move said member towards the end of said slot farthest from said dog.

In witness whereof I have affixed my signature this 16th day of December, 1927.

JAMES E. LOSHBOUGH.